July 21, 1953  W. J. BRUSKE  2,645,876
JAW TRAP LATCH DOG BRACKET PAN ASSEMBLY AND DELAYED-ACTION GUARD
Filed May 8, 1950  2 Sheets-Sheet 1
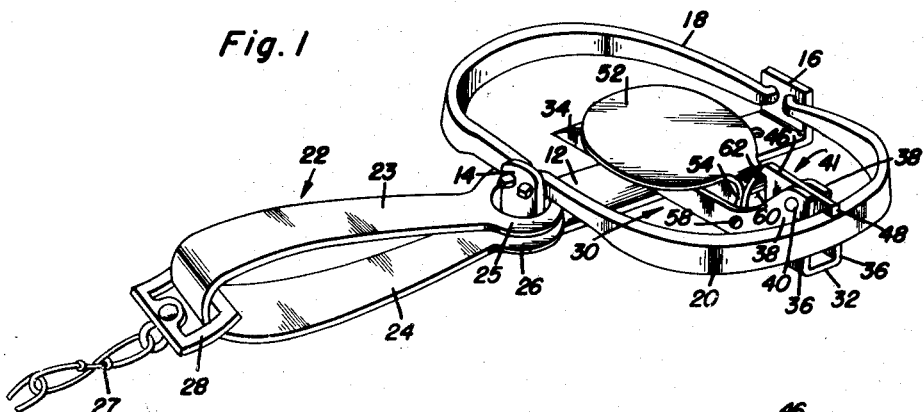
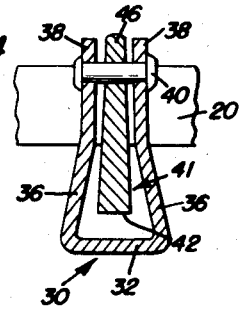
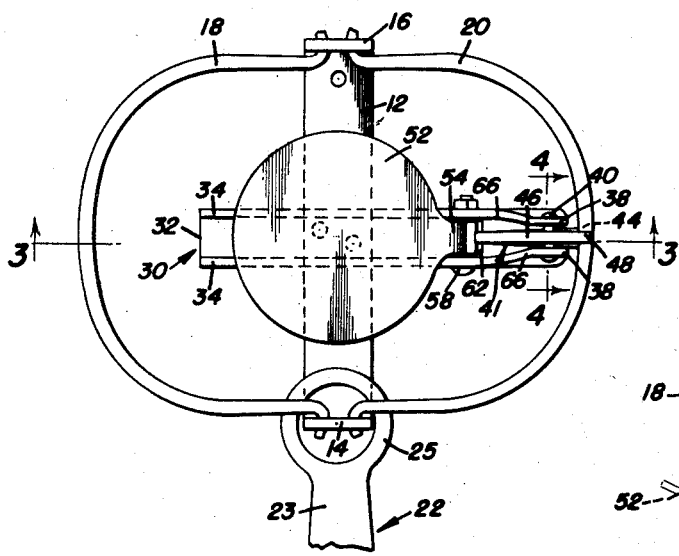
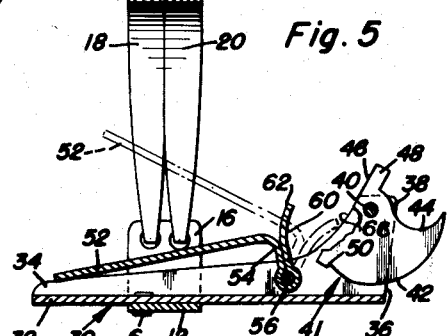
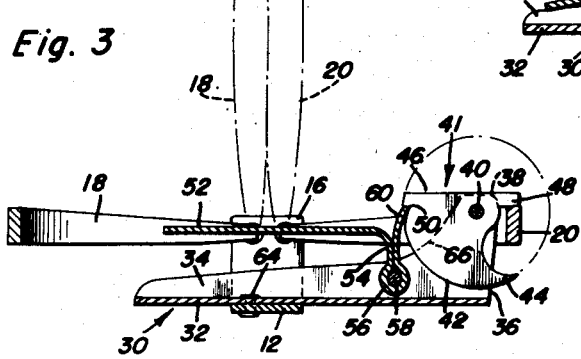
Walter J. Bruske
INVENTOR.

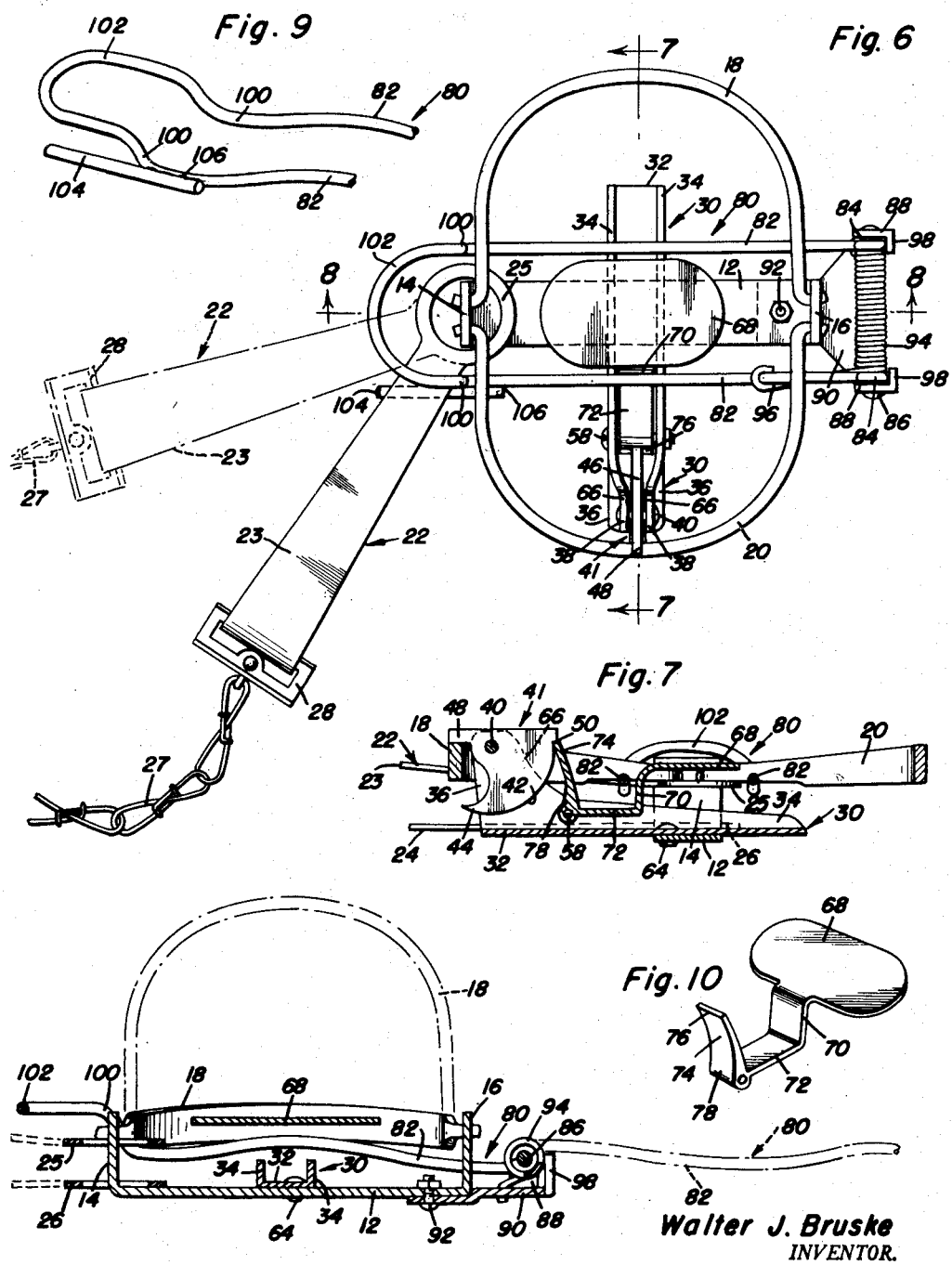

Patented July 21, 1953

2,645,876

UNITED STATES PATENT OFFICE 2,645,876

JAW TRAP LATCH DOG BRACKET PAN ASSEMBLY AND DELAYED-ACTION GUARD

Walter J. Bruske, Fall Creek, Wis.

Application May 8, 1950, Serial No. 160,787

4 Claims. (Cl. 43—92)

The present invention relates to certain new and useful improvements in so-called steel jaw game traps and has reference to a convertible trap construction which is characterized by a novel bracket, latch dog, trigger and pan assembly and a complemental escape-prevention U-guard, the latter being of a well known delayed action type.

A broad object of the invention is to structurally, functionally and otherwise improve upon commonly used steel jaw traps by retaining those features which have, by trial and error, proved to be satisfactory and to supplement same with worthy refinements and betterments which, combinedly construed, provide a trap in which manufacturers, users and others will find their overall needs fully met, contained and advantageously available.

A significant and highly important phase of the invention has to do with a novelly constructed bracket, latch dog, trigger and pan assembly for attachment to the usual base bar of a common type steel jaw trap. That this aspect of the invention may be best understood and appreciated, it is to be pointed out that said assembly has to do with distinct improvements on a basically similar assemblage shown, described and claimed in Patent 2,502,035, granted to me under date of March 28, 1950.

Briefly summarized, the patented assembly attachment is characterized by an L-shaped bracket embodying a long limb and a short limb, the latter limb and the adjacent end portion of said olng limb being bifurcated and providing furcations and defining a clearance notch between said furcations, said notch being open at one end, a hinge pin mounted in the free end portions of said furcations and bridging the open end of said notch, a substantially quadrantal latch dog concentrically pivoted on said pin and swingable back and forth in a prescribed arcuate path through said notch, said latch dog being weighted and adapted to drop under the forces of gravity from its jaw setting and retaining to its free-to-reset position, said dog having a curvate marginal edge portion defining a 90° arc and thus adapted to swing witin the circumscribing limits of a predetermined circular path, having a second marginal edge portion cut away and defining a reset beak, and having a third marginal edge portion which is flat, linearly straight from end to end, one end of said edge portion projecting beyond the second-named edge portion and providing a jaw detent, the latter adapted to overhang the stated jaw, and said beak being designed and located to underlie said jaw, a relatively short trigger post mounted on said long limb inwardly of and substantially parallel to the short limb and provided with a horizontal pivot on a plane well below the plane of the aforementioned pin, a pan, and a trigger having a shank attached rigidly at one end to said pan, the opposite end of said shank being laterally bent upon itself into an attaching and hinging eye, said eye being hingedly mounted on the pivot carried by said trigger post, the terminal end of said shank constituting a trigger and being coactable with the curvate marginal edge on said latch dog, the latter being provided, on said marginal edge, with a keeper notch for said trigger.

In the instant matter, instead of using an L-shaped bracket, I provide a rigid bracket which is channel-shaped in cross section and which has a flat bottom or bight portion and longitudinal vertical channel walls or flanges. The flanges extend from end to end. A horizontal pivot pin is mounted between the flanges at one end of the bracket and this bridges the channel portion. A substantially quadrantal latch dog is concentrically pivoted on the pin and is swingable back and forth in a prescribed arcuate path between said flanges, said latch dog being weighted and adapted to drop, under forces of gravity, from its jaw setting and retaining to its free-to-reset position. A second horizontal hinge pin is also supported between the flanges and this is parallel to and inwardly of and on a plane below that of the first named pin. The second pin serves as anchoring and hinging means for special pan means which comprises a pan having a shank bent upon itself so that it forms a hinge knuckle which is seated in the "channel" and hingedly attached to the pin. Bending of the shank is such that the free end portion thereof is laterally directed and forms a broad trigger for engagement with keeper means therefor on a coacting edge portion of a latch dog.

Further improvement resides in gradually increasing the vertical height of each of the flanges at the outward end of the bracket with the extended portions of the flanges defining closely spaced parallel ears to accommodate the stated hinge pin and to permit effective cradling and pendulous action of the latch dog which is suspended from the pin between the ears and flanges.

Further novelty is predicated on the feature of closely spacing the ears so that the inward vertical edges thereof constitute stop shoulders for the coacting end of the trigger, whereby the trigger, coming into contact with said edges limits the upward and outward arc of swing of the pan and trigger and in this way the pan is prevented from flopping over completely to be possibly twisted and broken by the struggles of an animal which has been caught. This safety pan stop arrangement prevents the pan destruction and the loose suspension of the latch dog with proper clearances between surfaces of same and the ears serve to prevent sticking in case of the possible accumulation of rust when the trap is in use on the trap line.

Then, too, novelty is predicated on substituting a simple hinge pin for the post which is commonly used in brackets of this type. Further, considerable portions of the anchoring and hinging shank on the pan are confined and guarded against displacement and damage in the space between the wall forming flanges of the channel bracket.

It is a matter of common knowledge that escape-preventing U-guards are not new in the art and a guard possessed of similar structural characteristics and functions is disclosed, for example, in a patent to one J. U. Lehn, 2,216,919 of October 8, 1940. My novel escape-proof trap, especially for muskrat trapping in shallow water sets, is novel. In carrying out this phase of the invention and to obtain the desired delayed action, I overcome bothersome and awkward prior constructions and obviate the use of shortened anchoring chains and entangling key bar trip means. To this end, I merely take advantage of natural trapping procedure to get results. Most all experienced trappers have the habit of turning the V-spring sideways, that is toward the latched jaw, when setting out long-spring traps, this for several reasons. One reason is that the loose jaw generally is disposed to lay lower and the trap is less apt to accidentially tip. Another reason is that the animal intended to be caught will not be required to step over or on the spring, when the trap is properly set, parallel with the expected approach.

As stated, the above is common trapping practice and I take advantage of it in the present invention by simply attaching a finger to the bight portion of the guard. This finger is so positioned that it catches under the lower side of the upper arm of the jaw closing spring, while the bight portion overlies said arm, that is, when the spring is turned to the position herein shown. Hence, when an animal springs a trap and is caught, the finger prevents the U-guard from flying up and over immediately and delays such action until the animal, in its struggle to get free, tightens the anchoring chain, which naturally straightens out the V-spring and consequently releases the leg embracing U-guard for desired results.

Other objects and advantages will become more readily apparent from the following description and the accompanying illustrative drawings.

In the accompanying drawings wherein like numerals are employed to designate like parts throughout the views:

Figure 1 is a perspective view of a steel jaw game trap embodying my new and improved bracket, latch dog and special trigger equipped pan assembly.

Figure 2 is a top plan view of the same.

Figure 3 is a section taken on the line 3—3 of Figure 2, looking in the direction of the arrows.

Figure 4 is an enlarged fragmentary section on the line 4—4 of Figure 2, looking in the direction of the arrows.

Figure 5 is a view like Figure 3 wherein the trap has been sprung, said view showing, in dotted lines, the restricted upward and outward tilt of the pan which minimizes pan and trigger destruction.

Figure 6 is a top plan view of a steel jaw trap illustrating the escape prevention U-guard attachment and the special narrow pan used in connection therewith.

Figure 7 is a view taken on the plane of the line 7—7 of Figure 6, looking in the direction of the arrows.

Figure 8 is a view at right angles taken on the plane of the line 8—8, looking in the direction of the arrows.

Figure 9 is a fragmentary perspective view of the especially designed trippable end of the narrow gauge U-guard.

Figure 10 is a perspective view of the pan and trigger unit shown in Figures 6 and 7.

Briefly and by way of introduction to the following detailed description the invention in its preferred aspect is characterized briefly as comprising a horizontal base bar having upturned terminal ends, complemental steel jaws having end portions hingedly joined to said upturned ends, a chain-equipped V-spring having eyes operatively connected with one upturned end and interposed between said bar and jaws, a rigid channel-shaped bracket secured to and extending at right angles from an intermediate portion of said base bar, said bracket embodying a bight portion and side flanges, the latter commensurate in length with said bight portion, a latch dog pivotally mounted for operation between outer end portions of said flanges, an ovate flat pan at right angles to said bracket and parallel with said base bar, said pan having a shank terminating in an upstanding trigger which is engageable with said latch dog, that portion of the shank between the pan and trigger being downwardly offset and, when the trap is set, being substantially confined in the channel and shielded by and between said flanges, a narrow-gage delayed-action U-guard embodying spaced parallel limbs and a connecting bight portion for said limbs, said limbs being spring-hinged at corresponding ends to one end of said base bar, said U-guard underlying said jaws with its limbs straddling the pan and with its bight portion interposed between the jaws and the upper member of said V-spring, one of said limbs overlying the offset portion of said shank, the bight portion of said U-guard being upwardly offset and overlying the upper member of said V-spring, and a trip finger rigidly secured to and in general alignment with one limb of said U-guard, underlying said bight portion and also underlying said upper member, whereby to provide, in conjunction with said bight portion, an embracing catch for said upper member.

Reference will be had first to Figures 1 to 5 inclusive. As stated before, the steel jaw trap proper is of general or ordinary construction. It comprises a flat horizontal base bar 12 having upstanding ends 14 and 16 with which the complemental jaws 18 and 20 are hingedly connected. The V-type jaw closing spring, also conventional, is denoted by the numeral 22 and its arms 23 and 24 terminate in customary eyes 25 and 26 which encircle the upbent end 14. The customary anchoring chain is denoted at 27 and this is attached by a link 28 to the spring 22.

The improved bracket, latch dog, pan and trigger assembly comprises an elongated channel shaped bracket 30 having a flat bight or bottom portion 32 and duplicated side or end flanges 34—34. In a lengthwise direction the flanges are gradually increased in vertical height toward the outer end portion of the bracket and may be said to include extensions 36—36 terminating in upstanding spaced parallel ears 38—38. The extensions converge as shown in Figure 4 and bring the ears into close spaced parallelism. A hinge pin 40 is mounted in the ears and spans the "channel" and this serves to accommodate and support the latch dog 41. The latch dog is substantially quadrantal and is concentrically pivoted on the pin 40 and is swingable back and forth between the ears 38 and coacting flanges 36, this in a prescribed arcuate path. The latch dog is suitably weighted and adapted to drop under the forces of gravity from its jaw setting and retaining to its free-to-reset position. It is provided with a curvate marginal edge portion 42 (see Figs. 3 and 5) defining a 90° arc and is thus adapted to swing within circumscribing limits of a predetermined circular path as shown in dotted lines in Fig. 3. The outer vertical marginal edge is relieved or cut away and defines a reset beak 44. The third edge 46 is substantially flat and straight from end to end and one end portion projects beyond the second named edge and provides a jaw detent 48 which latter is adapted to overhang the jaw 20 as shown in the drawings. The beak 44 is designed and located to underlie said jaw 20. The marginal edge portion 42 is provided with a niche defining a keeper notch 50. The latch dog hangs loosely between the parts 38 and 36 as shown in Fig. 4. The circular pan here shown at 52 is provided with a shank which corresponds substantially in width with the inside width of the channel. The shank is downbent at 54 as shown in Figures 3 and 5 and is then bent upon itself to form a hinge knuckle 56 which is anchored and hinged on a second hinge pin 58 mounted between the flanges 34 and protected by the flanges. The free end portion of the shank is longitudinally curvate and defines the trigger 60 which has a broad tip portion 62 to engage in the keeper notch 50. The bracket is riveted or otherwise secured at right angles to the intermediate portion of the base bar as at 64. The upstanding edge portions 66 of the ears constitute stops or abutments and limit swing of the pan and trigger as shown in dotted lines in Figure 5.

The description will now be with reference to Figures 6 to 10 inclusive. In these figures the steel jaw trap is the same in construction and therefore the same numerals are employed to designate like parts. The channel-shaped bracket is the same and therefore the same numerals are employed to denote like parts in all views. In this form of the invention, the pan and trigger means already described is replaced by a differently constructed unit which is shown in Figure 10. This comprises an elongated or ovate flat pan 68 having a substantially U-shaped shank embodying a downbent limb 70, a flat bight portion 72 and an upbent limb 74 terminating in a broad surface end or detent 76 to engage the keeper notch 50 in the latch dog. At the juncture of 72 and 74 a bored enlargement 78 is provided and this is hinged mounted on the hinge pin 58. Incidentally, the hinge pin is in the form of a bolt as shown and may be removed so that either type of pan (that shown in Figure 1 or that shown in Figure 10) may be used. This is the "convertible" feature of the over-all trap construction.

The novel escape-preventing U-guard is denoted by the numeral 80 and is a narrow gauge member and has suitably bent limbs 82—82 which terminate in eyes 84—84 hingedly mounted on a hinge pin 86. The pin is supported in suitable uprights 88—88 on an adapter bracket 90 bolted at 92 to one end portion of the base bar 12. Suitable spring means 94 is provided and one end is anchored as at 96 on the adjacent limb 82 as best shown in Figure 6. This is an ordinary way of attaching a U-guard to a steel jaw trap. It is to be noted, however, that the uprights 88 are provided with inturned stops 98—98 which check the throw or swing of the U-guard when it swings from the full line position (see Figure 8) to the dotted line position here shown. The limbs 82 are offset or bent as at 100 in Figure 9 to thus upset the bight portion 102. One limb is provided with a cylindrical trip finger 104 which is welded or otherwise secured in place at 106. This underlies the adjacent bend and the two features, the bight portion 102 and trip finger 104 serve to embrace the upper lower sides respectively of the arms 23 of the spring 22 when the latter is set in the full line position shown in Figure 6. This is of course the "set" position of the U-guard at which time the limb portions underlie the jaws 18 and 20. The bend 70 in the pan construction serves to clear one limb 82 as shown and the pan proper 68 is confined in the limited space between the respective limbs. That is to say, the limbs straddle the longitudinal edge portions of the pan.

Most persons who have had little experience with traps have difficulty in setting them. This is because they try to compress the springs with their grip alone. If the trap spring is held in the left hand, against the left knee or leg, and pressure is then exerted on the upper side of the spring with the heel of the hand, it is easy. The right hand fingers should be under the cross bar and latch dog of the trap and the right hand thumb should be free to reach up and pull the trap jaw down in contact with the re-setting beak of the latch dog. Pincer pressure of the thumb on the jaw and with the fingers beneath the cross bar is then adjusted to bring the keeper notch of the dog in position to engage the trigger, which is cooperatively brought about by raising the pan with the index finger of the left hand from under the loose jaw. Engagement can also be had by tilting the entire trap with the loose jaw uppermost and toward you until gravity causes the pan to tilt of its own weight and thereby automatically bringing the trigger into contact position.

To set the trap after the escape-prevention guard has been attached, pull the guard over onto the top of the jaw closing spring, with the guard arms straddling the closed jaws. Then place the heel of the left hand on both the guard and trap spring and proceed, in the usual way, to complete the setting of the trap. When the trap is set, grasp the spring near its end with the right hand and with the left hand under the trap turn the spring as far as it will go toward the latched jaw and the trap is ready to set out.

My improved channel bracket has the advantage of being light in weight but very rigid due to its channel formation. The channel walls provide suitable supports for the vital latch dog and coacting pan-trigger. All necessity for the usual extra pan post is eliminated. The converged channel walls or ears near the latch dog pivot provide an effective stop for the trigger, restricting unnecessary pan tilt which prevents pan shank destruction, a bad feature in ordinary traps. The channel walls positively guard the trigger shank of the special U-guard companion pan against interference by the U-guard arm in any eventuality, should the said arm become bent by rough use. The guarded pan shank prevents premature tripping of the latch should an animal step on the guard before stepping on the pan.

With the addition of my improved attachable escape-prevention U-guard and companion pan my general purpose trap can be quickly converted for the special purpose of trapping muskrats in shallow water not deep enough to properly drown the animal. The novel trip finger used on my U-guard which catches under the jaw-closing spring to delay the action eliminates the usual key-bar on the staking chain of other modern guarded traps. It also eliminates annoying tangles in the trapper's pack sack and the awkward bunching of the chain near the set trap. With my device there is no accidental tripping of the U-guard in setting out traps in hard-to-get-at places.

The flatwise pan shank 72 which is a feature in my invention affords the necessary clearance and makes possible the first really successful application of the narrow gauge U-guard to a cross bracket general purpose trap. Other modern general purpose cross bracket traps cannot very well adopt the narrow gauge leg-embracing guard because the commonly used edgewise pan shank is in the way. My flatwise pan shank is therefore vitally important.

By a "general purpose trap" I means a trap that can be successfully used for all around trapping of the usual variety of animals of a size within reasonable likeness to correspond with the size of the trap.

As previously stated, when using the U-guard, it is necessary to place the spring 22 in the position shown in Figure 6. This makes it possible to cause finger 104 to underlie arm 23 of spring 22 and the offset bight portion 102 to overlie the same arm. Consequently, when the trap is sprung and the animal is caught, the detailed trip finger 104 prevents the guard 80 from flying up and over immediately and delays such action until the animal, in its struggle to get free, tightens the anchoring chain 27 which naturally straightens out the spring to take the dotted line position shown in Figure 6 and to simultaneously release the U-guard 80.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice provided that no departure is made from the invention as claimed.

Having described the invention, what is claimed as new is:

1. A steel jaw trap comprising, in combination, a horizontal base bar, steel jaws having end portions hingedly joined to end portions of said base bar, a chain-equipped V-spring having eyes operatively associated with said bar and jaws, a rigid channel-shaped bracket secured to and extending at right angles from an intermediate portion of said base bar, said bracket embodying a bight portion and side flanges, the latter commensurate in length with said bight portion, a latch dog pivotally mounted for operation between outer end portions of said flanges, a flat pan above said bracket and substantially parallel with said base bar, said pan having a shank terminating in an upstanding trigger which is engageable with said latch dog, that portion of the shank between the pan and trigger being downwardly offset and, when the trap is set, being substantially confined in the channel and shielded by and between said flanges, a narrow gage delayed-action U-guard embodying spaced parallel limbs and a connecting bight connecting corresponding ends of said limbs, said limbs being spring-hinged at opposite corresponding ends to one end of said base bar, said U-guard underlying said jaws with its limbs straddling and spaced from adjacent edges of the pan and with said limbs underlying said jaws and with the bight portion overlying the upper member of said V-spring, one of said limbs overlying the offset portion of said shank, and a projecting finger rigidly secured to and in general alignment with one limb of said U-guard, underlying said bight portion and also underlying said upper member, whereby to provide an embracing catch with which said upper member is releasably engaged.

2. A steel jaw game trap comprising a horizontal disposable base bar having upturned ends, complemental downwardly opening, upwardly closing jaws hingedly attached at their respective ends to the respective upturned ends, a V-spring for closing said jaws, said spring having arms provided with eyes operatively anchored on one upturned end and interposed between the base bar and jaws when the jaws are in open position, a chain attached to said spring at one end and adapted to be secured to a stationary stake at an opposite end, an escape preventing delayed-action U-guard adapted to overlie and assume a position parallel to said base bar said U-guard being provided with limbs which are adapted to underlie said jaws when the latter are in their open trapping position and having their respective free ends spring-hinged to an adjacent corresponding upturned end of said base bar remote from the position of said V-spring, the opposite ends of said limbs being joined by a bight portion which, when the trap is set, projects outwardly beyond the first named upturned end and adjacent hinged ends of said jaws, a rigid finger fixedly secured to one of said limbs adjacent to said bight portion, said bight portion being laterally offset in a plane above the plane of the finger and cooperating with the latter in upwardly spaced relation and defining a catch which is adapted to be releasably engaged with one arm of the V-spring, a latch dog, a bracket therefor attached to said base bar, and a trigger-equipped pan pivotally mounted in said bracket, said trigger being releasably cooperable with said latter dog and joined to said pan by way of a shank carried by the pan, and said shank being at right angles to and underlying and clearing beneath the adjacent limb of said U-guard.

3. As a new article of manufacture, an attachment for use on a steel jaw game trap of the type having a base, jaws hingedly mounted on said base and a V-spring operatively arranged for closing the jaws to trap an animal; a substantially elongated U-shaped delayed action escape preventing guard embodying spaced limbs having eyes at their free ends connected by spring-equipped hinge means to the end of the base, the opposite ends of said limbs being joined together by way of a bight portion, the latter and adjacent but limited portions of the limbs being laterally offset to assume a plane different from that of the body portion of said limbs and being thus adapted to overlie a cooperating arm on said V-spring when the trap is in set position, a rigid finger fixedly attached to and carried by one of said limbs and substantially coplanar with said one limb and being disposed in approximate spaced parallelism relative to the offset bight portion and adapted to underlie said arm, whereby said arm may be temporarily and releasably confined in the space existing between the finger and offset bight portion.

4. A steel jaw game trap comprising a base bar, trapping jaws pivoted to the base bar, a bracket, latch dog, trigger and pan assembly mounted on and carried by said base bar, said pan having a shank pivotally mounted on said bracket and including a trigger cooperable with said latch dog, and a V-spring having one arm secured to the base bar and the other arm situated below said jaws when the latter are in open position, said V-spring being adapted to assume an oblique angled position relative to the lengthwise dimension of said base bar when occupying its finally set position, said trigger being adapted to release the jaws for movement by the V-spring in a manner to trap an animal, in combination with a U-shaped escape prevention guard pivoted at one end on the base bar and extending along the base bar from one side of the jaws to the opposite side thereof and having the bight end thereof located above one arm of the V-spring, said bight end having a projection therefrom extending beneath said one arm so that the trigger when released will effect release of the jaws to cause the V-spring to move the U-shaped member and simultaneously swing said jaws upwardly to effect the trapping of an animal therein, said V-spring having a chain attached at one end thereto, the opposite end of said chain being adapted to be connected with a relatively stationary anchoring stake, whereby the movement of the animal while trapped will cause the chain to become taut and cause the spring to move from between the bight end and the projection and to release the U-shaped guard for delayed action movement across the jaws in a direction toward the pivoted end of said U-shaped guard.

WALTER J. BRUSKE.

References Cited in the file of this patent
UNITED STATES PATENTS

| Number | Name | Date |
|---|---|---|
| 1,630,419 | Fortin | May 31, 1927 |
| 1,652,606 | Bush | Dec. 13, 1927 |
| 2,216,919 | Lehn | Oct. 8, 1940 |
| 2,502,035 | Bruske | Mar. 28, 1950 |
| 2,541,771 | Lazenby | Feb. 13, 1951 |